US011848837B2

(12) United States Patent
Levy et al.

(10) Patent No.: US 11,848,837 B2
(45) Date of Patent: Dec. 19, 2023

(54) NETWORK TELEMETRY BASED ON APPLICATION-LEVEL INFORMATION

(71) Applicant: MELLANOX TECHNOLOGIES, LTD., Yokneam (IL)

(72) Inventors: Aviad Levy, Ge'alya (IL); Lion Levi, Yavne (IL); Noam Bloch, Bat Shlomo (IL); Ortal Bashan, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/504,517

(22) Filed: Oct. 19, 2021

(65) Prior Publication Data
US 2023/0125017 A1    Apr. 20, 2023

(51) Int. Cl.
*H04L 43/06* (2022.01)
*H04L 43/04* (2022.01)
*H04L 67/025* (2022.01)

(52) U.S. Cl.
CPC .............. *H04L 43/06* (2013.01); *H04L 43/04* (2013.01); *H04L 67/025* (2013.01)

(58) Field of Classification Search
CPC ......... H04L 43/02; H04L 43/04; H04L 43/06; H04L 67/025
See application file for complete search history.

(56) References Cited

U.S. PATENT DOCUMENTS

| 7,701,859 | B2 | 4/2010 | Belkin et al. | |
|---|---|---|---|---|
| 8,671,097 | B2 | 3/2014 | Wu et al. | |
| 9,590,880 | B2 | 3/2017 | Ashby et al. | |
| 2003/0161265 | A1* | 8/2003 | Cao | H04L 43/50 370/229 |
| 2012/0144246 | A1* | 6/2012 | Dreyfoos | G06F 11/3466 714/47.1 |
| 2014/0198638 | A1* | 7/2014 | Campbell | H04L 47/32 370/235 |
| 2015/0046512 | A1* | 2/2015 | Ashby | H04L 43/08 709/203 |
| 2016/0092333 | A1* | 3/2016 | Liu | G06Q 10/06 702/186 |
| 2016/0204992 | A1* | 7/2016 | Wu | H04L 41/14 709/224 |
| 2016/0224461 | A1* | 8/2016 | Araya | G06F 11/3644 |
| 2018/0121309 | A1* | 5/2018 | Tabak | G06F 11/36 |
| 2018/0285240 | A1* | 10/2018 | Kou | G06F 11/3644 |
| 2018/0287915 | A1* | 10/2018 | Smith | H04L 51/42 |
| 2021/0303532 | A1* | 9/2021 | Chandrashekar | G06F 16/22 |

* cited by examiner

*Primary Examiner* — Johnny B Aguiar
(74) *Attorney, Agent, or Firm* — KLIGLER & ASSOCIATES PATENT ATTORNEYS LTD

(57) ABSTRACT

A network device includes processing circuitry and one or more ports. The one or more ports are configured to connect to a communication network. The processing circuitry is configured to receive a packet originating from a network node running an application program, the packet includes application-level metadata relating to the application program, to generate telemetry data based at least on the application-level metadata, and to transmit the telemetry data via one of the ports, over the communication network.

25 Claims, 6 Drawing Sheets

NETWORK TELEMETRY BASED ON APPLICATION-LEVEL INFORMATION

TECHNICAL FIELD

Embodiments described herein relate generally to data communication, and particularly to methods and systems for enriching telemetry data based on application-level information.

BACKGROUND

A communication network may be analyzed for identifying causes to performance degradation. To analyze network performance, network devices in the network may be configured to locally collect telemetry data and report it to a central entity for analysis and display.

Methods for network analysis using telemetry data are known in the art. For example, U.S. Pat. No. 9,590,880 describes a telemetry engine built into a client application installed on a client device, and the telemetry engine is configured to collect and analyze application data at the client device and report the analyzed data to a service provider associated with the application. The telemetry application includes a specialized set of components, such as a telemetry transport component configured to communicate with the service provider, a data collection module configured to retrieve data from the application, and a rule manager and analyzer configured to analyze collected data according to a set of data collection rules provided by the service provider. The telemetry engine enables collection and analysis of telemetry data from multiple distributed client devices. The client devices dynamically change over time to ensure that current and important information is reported to the service provider.

U.S. Patent Application Publication 2016/0092333 describes embodiments that are directed to a unified and extensible telemetry method together with a data telemetry model aimed at the data activities of a system. Information collected using the telemetry data model is analyzed using telemetry analytics to derive insights on data activities, through the analysis of single events and subsequent linear relationships between these events, as well as the more generally networked multi-dimensional relationships among the data activities. Such analysis can provide insights for system owners to understand past data activities, optimize current data activities, and predict future data activity demands and requirements.

SUMMARY

An embodiment that is described herein provides a network device that includes processing circuitry and one or more ports. The one or more ports are configured to connect to a communication network. The processing circuitry is configured to receive a packet originating from a network node running an application program, the packet includes application-level metadata relating to the application program, to generate telemetry data based at least on the application-level metadata, and to transmit the telemetry data via one of the ports, over the communication network.

In some embodiments, the application-level metadata includes an application identifier pre-assigned to the application program. In other embodiments, the application program has multiple execution states, and the application-level metadata includes a selected execution state among the multiple application states. In yet other embodiments, the processing circuitry is configured to generate the telemetry data in response to detecting that the application-level metadata includes the selected execution state and not any other execution state.

In an embodiment, the processing circuitry is configured to tag one or more parts of the telemetry data with respective tags related to the application program, based on the application-level metadata. In another embodiment, the processing circuitry is configured to trigger generation of the telemetry data in response to the application-level metadata. In yet another embodiment, the processing circuitry is configured to generate at least part of the telemetry data independently of the application-level metadata.

In some embodiments, the processing circuitry is configured to receive telemetry data collected by one or more other network elements coupled to the communication network, and to analyze the received telemetry data for presentation. In other embodiments, based on the application-level metadata, the processing circuitry is configured to mirror at least part of a packet including the telemetry data back to the network node that has sent the packet including the application-level metadata, for analysis. In yet other embodiments, the processing circuitry is further configured to run at least part of an analyzer program that analyzes the telemetry data based at least on parts in the telemetry data that are tagged in relation to application programs.

In an embodiment, the packet is included in a message that the application program sends over the communication network to a peer network node, the application-level metadata is indicative of a position of the packet within the message, and the processing circuitry is configured to generate the telemetry data based on the position of the packet within the message.

There is additionally provided, in accordance with an embodiment that is described herein, a method, including, in a network device that connects to a communication network, receiving a packet originating from a network node running an application program, the packet including application-level metadata relating to the application program. Telemetry data is generated based at least on the application-level metadata. The telemetry data is transmitted over the communication network.

There is additionally provided, in accordance with an embodiment that is described herein, a network node that includes a network adapter and a processor. The network adapter is configured to connect to a communication network. The processor is configured to run an application program, to generate a packet that includes application-level metadata, the application-level metadata to be used in generating telemetry data related to the application program by one or more network elements coupled to the communication network, and to send the generated packet to a destination node coupled to the communication network via the network adapter.

In some embodiments, the processor is configured to produce the application-level metadata, and to provide the application-level metadata to a library function or to the network adapter for incorporating the application-level metadata in the packet. In other embodiments, the processor is configured to incorporate the application-level metadata in the packet externally to the application program. In yet other embodiments, the processor is configured to incorporate the application-level metadata in the packet using a library function or using the network adapter, without involvement of the application program.

In an embodiment, the processor is configured to run a Profiler Injection Module (PIM) that is configured, in response to identifying that the application program calls a library function that sends the packet to the communication network, to incorporate the application-level metadata in the packet by replacing at least part of the library function with a function of the PIM. In another embodiment, the application program includes a distributed application program, and the processor is configured to run an instance of the application program in parallel with one or more instances of the application program running on one or more network nodes, the application-level metadata includes an instance identifier of the instance running on the network node. In yet another embodiment, the processor is further configured to run at least part of an analyzer program that analyzes the telemetry data based at least on parts in the telemetry data that are tagged in relation to application programs.

There is additionally provided, in accordance with an embodiment that is described herein, a method, including, in a network node that connects to a communication network, running an application program. A packet is generated, the packet includes application-level metadata to be used in generating telemetry data related to the application program by one or more network elements coupled to the communication network. The generated packet is sent to a destination node coupled to the communication network via the network adapter.

There is additionally provided, in accordance with an embodiment that is described herein, an analyzer that includes an interface and a processor. The interface is configured to provide access to telemetry data collected in a communication network. The processor is configured to receive telemetry data via the interface, the telemetry data includes one or more tagged parts that are tagged with relation to one or more application programs running on one or more network nodes coupled to the communication network, to analyze the telemetry data based at least on the one or more tagged parts, and to prepare the analyzed telemetry data for presentation.

In some embodiments, the telemetry data is collected by a collector from one or more network elements coupled to the communication network and stored in a database, and the processor is configured to receive the telemetry data by accessing the database via the interface.

There is additionally provided, in accordance with an embodiment that is described herein, a method, including, receiving via an interface telemetry data collected in a communication network, the telemetry data including one or more tagged parts that are tagged with relation to one or more application programs running on one or more network nodes coupled to the communication network. The telemetry data is analyzed based at least on the one or more tagged parts, and the analyzed telemetry data is prepared for presentation.

These and other embodiments will be more fully understood from the following detailed description of the embodiments thereof, taken together with the drawings in which:

DETAILED DESCRIPTION OF EMBODIMENTS

Overview

Figure 1:
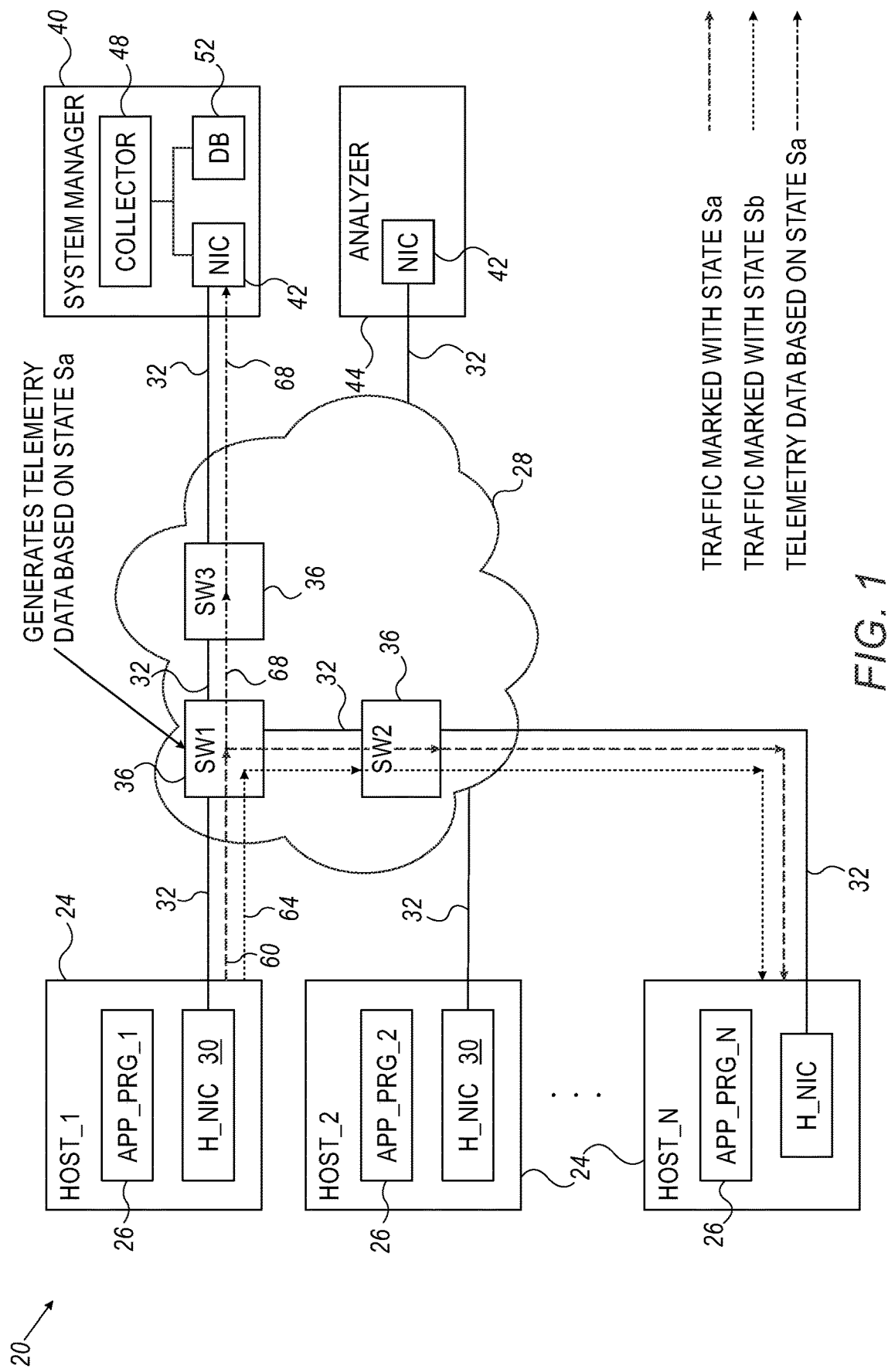
FIG. 1 is a block diagram that schematically illustrates a computing system in which telemetry data is generated depending on application-level metadata, in accordance with an embodiment that is described herein.

Embodiments that are described herein provide systems and methods for generating and analyzing telemetry data related to application programs.

Large scale computing systems such as data centers, cloud computing, High-Performance Computing (HPC), and distributed compute systems, may be deployed with a large number of network nodes and switches. The network nodes typically run application programs that communicate with one another over a communication network. An application program may have multiple execution states, e.g., for managing distributed computations.

Due to interactions among the application programs and/or between the application programs and the communication network, the performance of the application programs, and/or of the communication network may degrade significantly. Certain malfunction scenarios may occur, for example, when one or more application programs are at specific respective execution states.

In principle, the performance of a computing system may be analyzed using telemetry techniques. Conventionally, network devices that locally collect telemetry data are unaware of application-level information such as identities and execution states of application programs. Consequently, parts of the collected telemetry data that are related to different application programs or execution states are indistinguishable. Telemetry data is thus aggregated over multiple applications and execution states, which makes it hard to analyze and determine causes of performance degradation.

In the disclosed embodiments, network devices generate telemetry data based on, or in response, to application-level metadata marked in predefined locations of selected packets. As will be described below, this enables selective generation and tagging of telemetry data depending on the application-level metadata. Telemetry data that is generated based on application-level metadata may assist in associating between application programs and execution states, and network events, which is not possible in conventional telemetry methods.

Consider an embodiment of a network device that includes one or more ports and processing circuitry. The one or more ports are configured to connect to a communication network. The processing circuitry is configured to receive a packet originating from a network node running an application program, the packet comprising application-level metadata relating to the application program, to generate telemetry data based at least on the application-level metadata, and to transmit the telemetry data via one of the ports, over the communication network.

The application-level metadata may comprise, an application identifier pre-assigned to the application program, an execution state selected from among multiple predefined application states, and/or any other suitable type of application-level metadata. In an embodiment, the processing circuitry is configured to generate the telemetry data in response to detecting that the application-level metadata comprises the selected execution state and not any other execution state.

In some embodiments the processing circuitry tags one or more parts of the telemetry data, with respective tags related to the application program, based on the application-level metadata. Alternatively or additionally, the processing circuitry triggers generation of the telemetry data in response to the application-level metadata. In an embodiment, at least part of the telemetry data may be generated independently of the application-level metadata.

In an embodiment, a network device performs analysis of telemetry data. In such an embodiment, the processing circuitry receives telemetry data collected by one or more other network elements coupled to the communication network and analyzes the received telemetry data for presentation.

In some embodiments, a host sends to the communication network packets that carry application-level metadata, and analyzes corresponding telemetry data generated and sent back by the network device. In such embodiments, based on the application-level metadata, the processing circuitry mirrors at least part of a packet comprising the telemetry data back to the network node that has sent the packet that carries the application-level metadata, for analysis.

In some embodiments, the processing circuitry is further configured to run at least part of an analyzer program that analyzes the telemetry data based at least on parts in the telemetry data that are tagged in relation to application programs.

In an embodiment, the packet is comprised in a message that the application program sends over the communication network to a peer network node, wherein the application-level metadata is indicative of a position of the packet within the message, and the processing circuitry generates the telemetry data based on the position of the packet within the message.

For the host side, consider a network node that includes a network adapter and a processor. The network adapter connects to a communication network. The processor is configured to run an application program, to generate a packet that comprises application-level metadata, the application-level metadata is to be used in generating telemetry data related to the application program by one or more network elements coupled to the communication network, and to send the generated packet to a destination node coupled to the communication network via the network adapter.

The processor may generate the packet with the application-level metadata in various ways. In some embodiments, the processor produces the application-level metadata, and provides the application-level metadata to a library function or to the network adapter for incorporating the application-level metadata in the packet. In other embodiments, the processor incorporates the application-level metadata in the packet externally to the application program. In one such embodiment, the processor incorporates the application-level metadata in the packet using a library function or using the network adapter, without involvement of the application program. In another embodiment, the processor runs a Profiler Injection Module (PIM) that is configured, in response to identifying that the application program calls a library function that sends the packet to the communication network, to incorporate the application-level metadata in the packet by replacing at least part of the library function with a function of the PIM.

In some embodiments, the application program comprises a distributed application program, wherein the processor is configured to run an instance of the application program in parallel with one or more instances of the application program running on one or more network nodes, and wherein the application-level metadata comprises an instance identifier of the instance running on the network node.

In some embodiments, the network node performs analysis of telemetry data. In such embodiments, the processor is further configured to run at least part of an analyzer program that analyzes the telemetry data based at least on parts in the telemetry data that are tagged in relation to application programs.

In the disclosed techniques, telemetry data is generated based on application-level metadata carried by packets originating by hosts. The application-level metadata may be used by network devices for generating the telemetry data, therefore focusing on desired applications and execution states rather than on the entire runtime.

This may provide insight into interactions among application programs and between application programs and the communication network, and enables tuning the computing system for improved utilization of network resources, reduced latencies and increased data throughput.

System Description

FIG. 1 is a block diagram that schematically illustrates a computing system 20 in which telemetry data is generated depending on application-level metadata, in accordance with an embodiment that is described herein. Computing system 20 may comprise, for example, a data center, a HPC system or a distributed computing system.

Computing system 20 comprises multiple network nodes 24, denoted HOST_1 ... HOST_N, coupled to a communication network 28. A practical computing system may comprise thousands of network nodes 24. Network node 24 is also referred to herein as a "host." In the present example, hosts 24 are coupled to communication network 28 via network adapters 30 using links 32 of any suitable type. Network adapter 30 may comprise, for example, a Network Interface Controller (NIC), a smart NIC or a Data Processing Unit (DPU). A network adapter 30 serving a host 24 is denoted H_NIC in the figure.

In the present context and in the claims, the term "network element" refers to any device that is coupled to the communication network and that may be configured to collect telemetry data. For example, in FIG. 1 a network element may comprise a switch 36 or a network adapter 30.

Each of hosts 24 may run one or more application programs 26. In FIG. 1, HOST_1 . . . HOST_N run respective application programs denoted APP_PRG_1 . . . APP_PRG_N. A host 24 may run an application program, independently from other hosts. Alternatively, multiple hosts 24 may run a common application program simultaneously, e.g., a distributed program for performing distributed computations.

Communication network 28 may comprise, for example, a wired network, a wireless network or a combination of wired and wireless networks. Communication network 28 may comprise any suitable type of a network, operating in accordance with any suitable communication protocols, e.g., an Ethernet network or an InfiniBand™ network.

In the example of FIG. 1, communication network 28 comprises multiple interconnected network devices 36. Network device 36 may comprise a network switch, e.g., a smart switch. Alternatively, network device 36 may comprise any other suitable type of a network device that forwards packets in the communication network, such as a router.

In FIG. 1, computing system 20 further comprises a system manager 40 and an analyzer node 44, each of which is coupled to communication network 28 via a NIC 42. System manager 40 manages the operation of communication network 28, e.g., by configuring switches 36 with forwarding rules.

In some embodiments, switches 36 support generating telemetry data for analyzing the performance of computing system 20. The performance of the computing system may degrade, for example, due to local traffic bottlenecks in switches 36, interactions among application programs running on hosts 24, and interactions between the hosts and the communication network.

In some embodiments, system manager 40 configures switches 36 and/or H_NICs 30 with telemetry rules specifying generation of telemetry data. Some of these rules may specify generating and tagging telemetry data depending on application-level metadata carried in packets. System manager 40 may also configure switches 36 and/or H_NICs 30 with forwarding rules for the generated telemetry data to any suitable collector entity. In the example of FIG. 1, system manager 40 comprises a collector 48 that receives telemetry data from the communication network and stores the received telemetry data in a database (DB) 52.

In some embodiments, analyzer node 44 analyzes the performance of computing system 20 by receiving all or some of the telemetry data collected by collector 48. For example, the analyzer may query DB 52 (via the communication network or some other interface) for retrieving telemetry data for analysis. In analyzing the telemetry data, the analyzer takes into consideration telemetry data and tags related to application programs, e.g., for separating between parts of the telemetry data associated with certain application programs, execution states and flows.

The analyzer may present the analysis results or provide the analysis results for presentation using any suitable way. For example, the analyzed telemetry data may be consumed for presentation using one or more presentation Application Programming Interfaces (APIs) that support, for example, user questions regarding the analyzed telemetry data, or queries to a Data Base (DB) that contains the analyzed telemetry data. As another example, a presentation API may comprise a Graphical User Interface (GUI).

In the example configuration of FIG. 1, the system manager, collector and analyzer are implemented in one or more non-user servers externally to hosts 24. In alternative embodiments, each of the system manager, collector and analyzer may be implemented in a host 24 or distributed among multiple hosts 24. Further alternatively, the functionality of each of the system manager, collector and analyzer may be implemented in a single server or host, or distributed over multiple servers, hosts, network adapters, and/or switches. Moreover, at least part of the functionality of two or more of the system manager, collector and analyzer may be implemented in a common server, in an embodiment.

In some disclosed embodiments, computing system 20 supports generating telemetry data based on application-level metadata. In such embodiments, a host 24 may include, in packets that it sends to the communication network, application-level metadata such as an identifier of the application program from which the packets originated, an execution state of that application program at the time of generating the packet, and/or any other type of application-level metadata.

Switch 36 (and/or a network adapter 30) may respond to receiving a packet that carries application-level metadata in various ways. For example, the switch may trigger the generation of telemetry data depending on the application-level metadata. Alternatively or additionally, the switch may include in telemetry data that it generates tags related to the relevant application program, based on the application-level metadata. Tags of this sort may comprise, for example, an application program identifier, an execution state of the application program, a flow identifier of a flow used by the application program, an ingress to egress time latency and the like.

In the example of FIG. 1, HOST_1 runs application program APP_PRG_1 that has execution states denoted "Sa" and "Sb". HOST_1 sends packets originating by APP_PRG_1 to HOST_N. In the figure, traffic sent by APP_PRG_1 during execution state Sa is depicted using a line 60, and traffic sent by APP_PRG_1 during application state Sb is depicted using a line 64. HOST_1 marks packets to be sent to the communication network, with application-level metadata indicative of execution state Sa or Sb of the application program at the time of generating the packets.

In the present example, SW1 is pre-configured to generate telemetry data based on execution state Sa but not based on execution state Sb. Consequently, SW1 forwards packets originating in APP_PRG_1 marked with either execution state Sa or Sb to HOST_N via SW2, but generates telemetry data in response to identifying Sa (and not based on Sb) in the received packets. SW1 typically tags parts of the telemetry data in relation to one or more application programs, to be used by analyzer node 44. SW1 forwards the telemetry data to system manager 40 as depicted by line 68.

In some embodiments, HOST_1 implements at least part of the functionality of collector 48, analyzer node 44 or both. In such embodiments, a switch 36 may be pre-configured to respond to application-level metadata carried in packets, by generating and tagging telemetry data based on the application-level metadata, incorporating at least part of the generated telemetry data in the received packets, and mirroring these packets back to HOST_1, for analysis. In some embodiments, instead of mirroring an entire packet, only part of the packet is mirrored, e.g., to reduce usage of communication resources, increased security and the like.

In an embodiment, multiple hosts 24 run a distributed application. In this embodiment, one of the hosts (e.g., HOST_1) may be assigned to collect and analyze all (or part of) the telemetry data generated in the computing system.

Alternatively, a central collector and/or analyzer external to hosts 24 may be used for analyzing telemetry data related to the distributed program.

Block Diagrams of Various Elements Comprised in the Computing System

Figure 2:
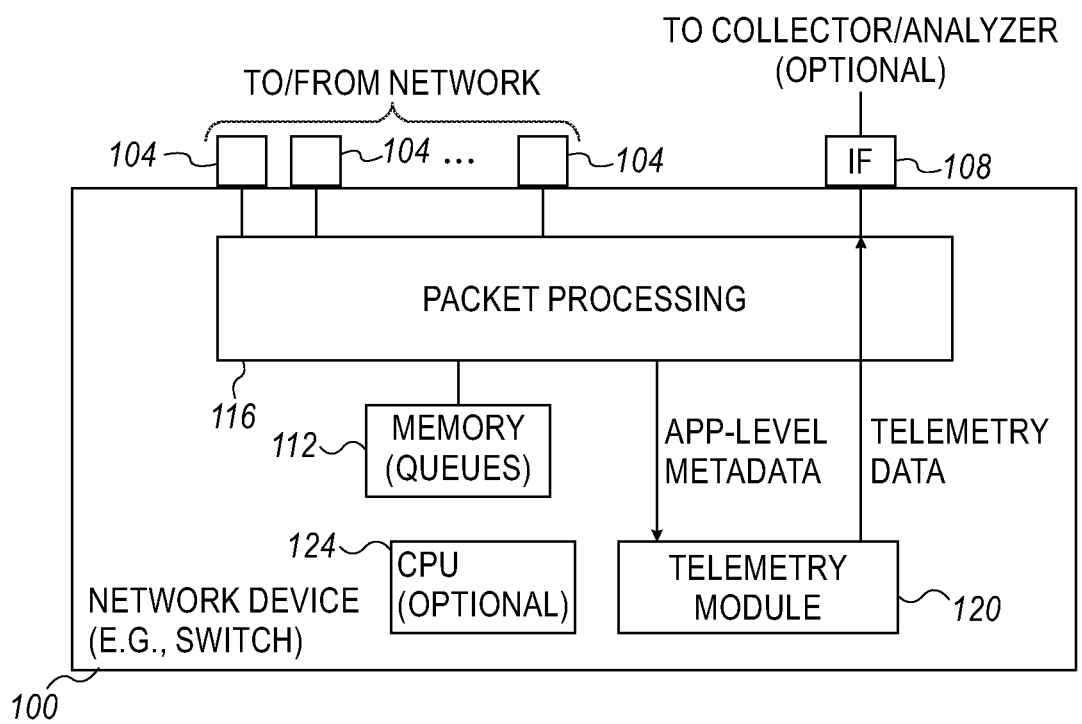
FIG. 2 is a block diagram that schematically illustrates a network device that supports generating telemetry data depending on application-level metadata, in accordance with an embodiment that is described herein.

FIG. 2 is a block diagram that schematically illustrates a network device 100 that supports generating telemetry data depending on application-level metadata, in accordance with an embodiment that is described herein.

Network device 100 may be used in implementing network device 36 of FIG. 1. In the description that follows, it is assumed that network device 100 comprises a network switch. A network switch is also referred to simply as a "switch" for brevity.

Switch 100 comprises ports 104 that connect to a communication network (e.g., communication network 28). In one embodiment, switch 100 may optionally comprise a dedicated interface 108 for connecting to a server implementing a collector, an analyzer or both.

Switch 100 comprises a memory 112 that stores packets received from the communication network in queues. A packet processing circuitry 116 processes the received packets to be transmitted back to the communication network. Among other tasks, packet processing circuitry 116 applies to the packets processing such as parsing, verification, forwarding and scheduling.

In some embodiments, switch 100 comprises a telemetry module 120 that generates telemetry data based on various events indicative of a local problem within the switch, and/or based on application-level metadata carried in received packets. Although the telemetry module is depicted separately from the packet processing circuitry, in alternative embodiments, the functionality of the telemetry module may be implemented, at least partially, by the packet processing circuitry. Events that may trigger the collection of telemetry data, independently of application-level metadata, may comprise, for example, congestion or overfill in one or more queues, detecting long latencies within the switch, and the like.

Application-level metadata in the received packets may comprise, for example, an application program identifier, a flow identifier, an execution state of the application, and the like. The telemetry module is configured (e.g., by system manager 40) to control the generation of telemetry data, based on the application-level metadata. In some embodiments, the configuration that the telemetry module uses for controlling the generation of telemetry data may be modified over time, e.g., based on the actual underlying application programs running. The telemetry module is also pre-configured to tag parts of the telemetry data in relation to application programs, based on the application-level metadata. For example, the telemetry module may tag selected parts of the telemetry data with application-level information such as application identifiers, execution states, and/or flow identifiers, as required.

In some embodiments, switch 100 comprises a Central Processing Unit (CPU) 124, in which case the switch is sometimes referred to as a "managed switch." The CPU may perform various control plane operations such as collecting and/or analyzing telemetry data produced by one or more switches and/or network adapters.

Figure 3:
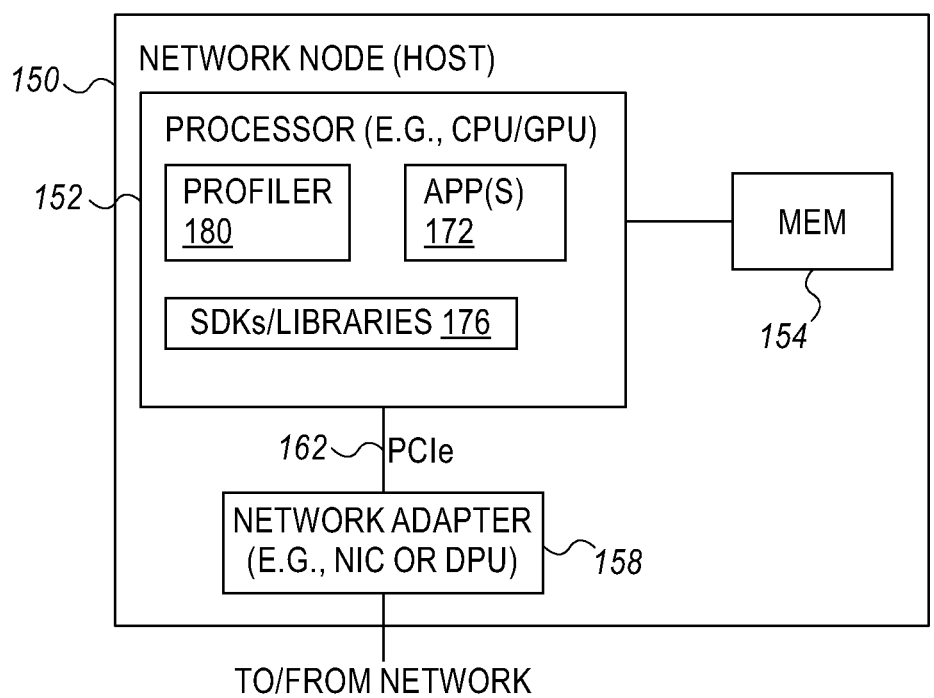
FIG. 3 is a block diagram that schematically illustrates a network node that incorporates application-level metadata into selected packets, in accordance with an embodiment that is described herein.

FIG. 3 is a block diagram that schematically illustrates a network node 150 that incorporates application-level metadata into selected packets, in accordance with an embodiment that is described herein.

Network node (e.g., host) 150 may be used in implementing network node (host) 24 of FIG. 1.

Host 150 comprises a processor 152 and a memory 154. Processor 152 may comprise, for example, a CPU, a Graphics Processing Unit (GPU), or any other suitable processor.

Processor 152 is coupled to a communication network (e.g., communication network 28) using a network adapter 158. Processor 152 may connect to network adapter 158 using any suitable bus or link 162, e.g., a Peripheral Component Interconnect Express (PCIe) bus. A block diagram of a network adapter is described below with reference to FIG. 5.

Processor 152 runs one or more application programs 172. An application program 172 may comprise, for example, an independent application program or a distributed application that is executed in parallel with one or more instances of the application program running on one or more network nodes. In some embodiments, application program 172 has multiple execution states, which may comprise, for example, an initialization state, one or more computation states, one or more communication states, a breakdown state and/or any other suitable execution states. An application-level program may communicate over the communication network using multiple flows. In this case, the application-level metadata may include pre-assigned flow identifiers, e.g., in addition to or instead of the application-level identifier.

Processor 152 has access to pre-compiled Software Development Kits (SDKs) or libraries 176 supporting one or more functions that an application program may call in communicating packets over the communication network. In some embodiments, an SDK/library 176 may support a function that locally incorporates application-level metadata in packets to be sent, without the relevant application program being aware of this operation.

In some embodiments, multiple different methods for incorporating metadata in packets may be supported and used. For example, an application program may notify the SDK/libraries, via a dedicated API, to mark a packet with an execution state (or other application-level metadata) that the SDK/libraries cannot identify internally. The SDK/library may mark the packet with execution states (or other application-level metadata) that are detectable by the SDK/library independently of the application program.

In some embodiments, processor 152 runs a profiler 180 that manages profiling sessions. Execution of profiling sessions will be described in detail below, with reference to FIG. 8.

Figure 4:
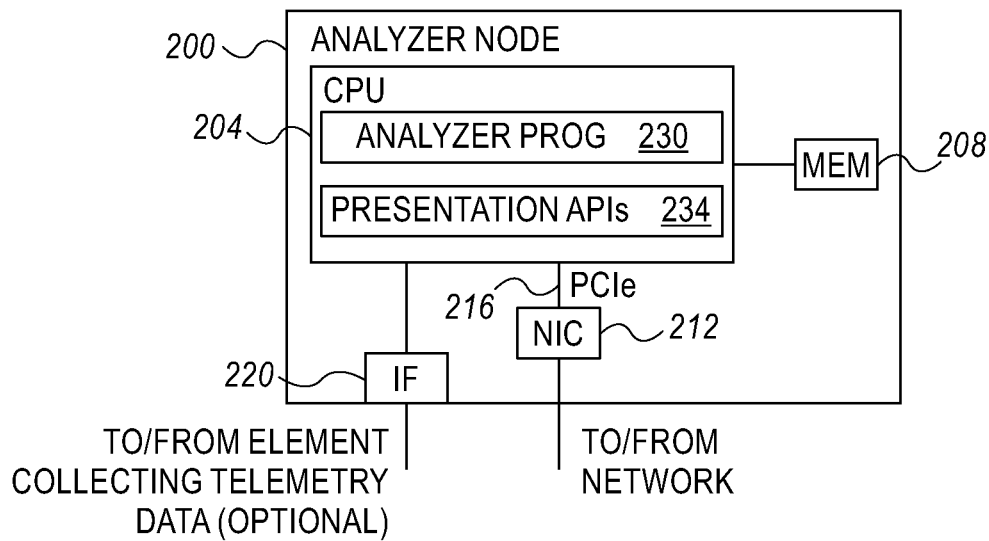
FIG. 4 is a block diagram that schematically illustrates an analyzer node that supports analyzing telemetry data that was generated and tagged based on application-level metadata, in accordance with an embodiment that is described herein.

FIG. 4 is a block diagram that schematically illustrates an analyzer node 200 that supports analyzing telemetry data that was generated and tagged based on application-level metadata, in accordance with an embodiment that is described herein.

Analyzer node 200 comprises a CPU 204 and a memory 208. CPU 204 communicates over a communication network (e.g., communication network 28 of FIG. 1) using a network adapter 212 (e.g., a NIC) to which the CPU connects using any suitable link or bus 216, such as a PCIe bus. Analyzer node 200 may receive, via NIC 212, telemetry data that has been generated by various elements in the communication network. In some embodiments, the analyzer node comprises a dedicated interface 220 that may be used for receiving telemetry data, e.g., from a managed switch or from a collector node.

CPU 204 runs an analyzer program 230 that receives telemetry data generated by elements of the communication network. In some embodiments, at least part of telemetry data received for analysis relates to one or more application programs running on hosts of the underlying computing system, and certain parts of the telemetry data may be tagged based on application-level metadata. The analyzed telemetry data may be consumed via any suitable API 234.

Figure 5:
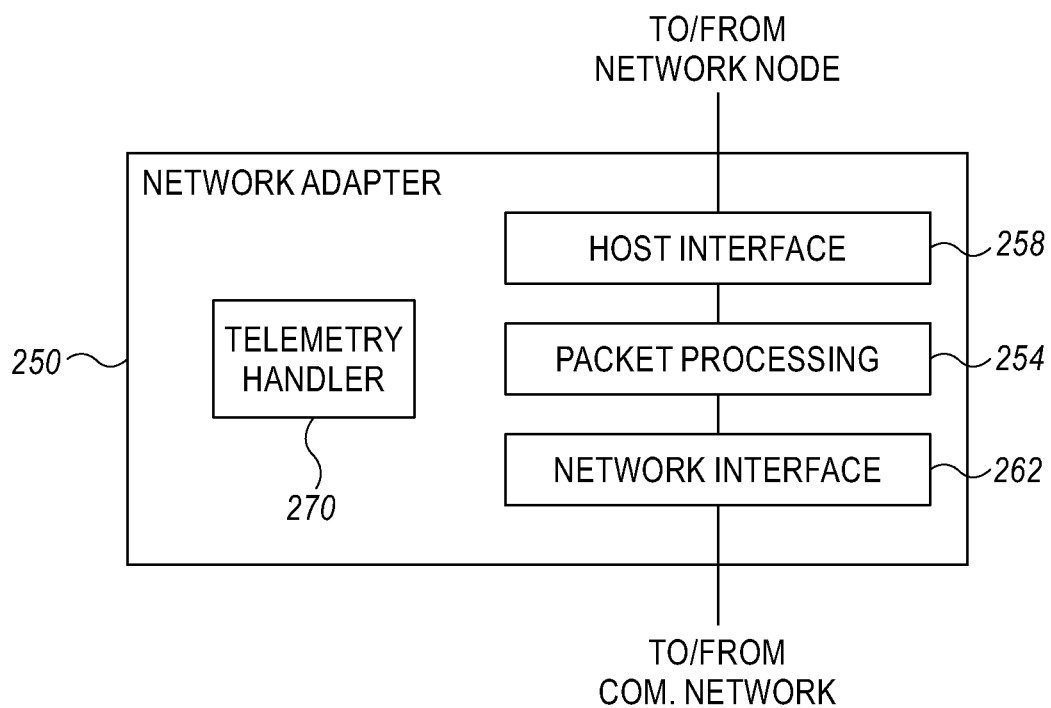
FIG. 5 is a block diagram that schematically illustrates a network adapter that supports incorporation of application-level metadata into selected packets, in accordance with an embodiment that is described herein.

FIG. 5 is a block diagram that schematically illustrates a network adapter 250 that supports incorporation of application-level metadata into selected packets, in accordance with an embodiment that is described herein.

Network adapter 250 may be used in implementing network adapter 30 and/or NIC 42 of FIG. 1, and/or network adapter 158 of FIG. 3. Network adapter 250 may comprise any suitable type of a network adapter such as, for example, a Host Channel Adapter (HCA), a NIC or a smart NIC. In some embodiments, network adapter 250 is comprised in a Data Processing Unit (DPU) (not shown).

Network adapter 250 comprises a packet processor 254 that connects to a host via a host interface 258, and to a communication network (e.g., communication network 28 of FIG. 1) via a network interface 262. Among other tasks, packet processor 254 selectively applies to incoming and outgoing packets processing such as parsing, verification, forwarding and scheduling.

In some embodiments, network adapter 250 comprises a telemetry handler 270. In the outbound direction, the telemetry handler may incorporate application-level metadata related to a given application program in one or more outgoing packets. In the inbound direction, the telemetry handler may receive telemetry data and provide the telemetry data to the host for analysis. Alternatively or additionally, the telemetry handler may perform at least part of the functionality of telemetry data collection and analysis.

In some embodiments, network adapter 250 comprises a DPU. In an embodiment, the DPU comprises a high-performance System on a Chip (SoC) having a software-programmable multi-core CPU, e.g., based on Arm architecture. In some embodiments, the DPU may collect and/or analyze telemetry data received from the communication network.

The configurations of computing systems 20, network device 100, network node 150, analyzer node 200, and network adapter 250 in respective FIGS. 1-5 are example configurations, which are chosen purely for the sake of conceptual clarity. In alternative embodiments, other suitable computing system, network device, network node, analyzer node, and network adapter configuration can also be used. Elements that are not necessary for understanding the principles of the present invention, such as various interfaces, addressing circuits, timing and sequencing circuits and debugging circuits, have been omitted from the figures for clarity.

Some elements of network device 100, such as packet processing circuitry 116, telemetry module 120 and (optional) CPU 124, some elements of network node 150 such as processor 152 and network adapter 158, some elements of analyzer node 200 such as CPU 204 and NIC 212, and some elements of network adapter 250, such as packet processor 254 and telemetry handler 270, may be implemented in hardware, e.g., in one or more Application-Specific Integrated Circuits (ASICs) or Field Programmable Gate Arrays (FPGAs). Additionally or alternatively, packet processing circuitry 116, telemetry module 120, CPU 124, processor 152, network adapter 158, CPU 204, NIC 212, packet processor 254 and telemetry handler 270, can be implemented using software, or using a combination of hardware and software elements. Memory 112 of network device 100, memory 154 of network node 150 and memory 208 of analyzer node 200 may comprise any suitable storage element such as, for example, a Random-Access Memory (RAM), or a Nonvolatile memory (NVM) such as a Flash memory device.

In some embodiments, some of the functions of packet processing circuitry 116, telemetry module 120, CPU 124, processor 152, CPU 204, packet processor 254, and telemetry handler 270 may be carried out by general-purpose processors, which are programmed in software to carry out the functions described herein. The software may be downloaded to the relevant processor in electronic form, over a network, for example, or it may, alternatively or additionally, be provided and/or stored on non-transitory tangible media, such as magnetic, optical, or electronic memory.

Methods for Generating Telemetry Data Related to Application Programs

Figure 6:
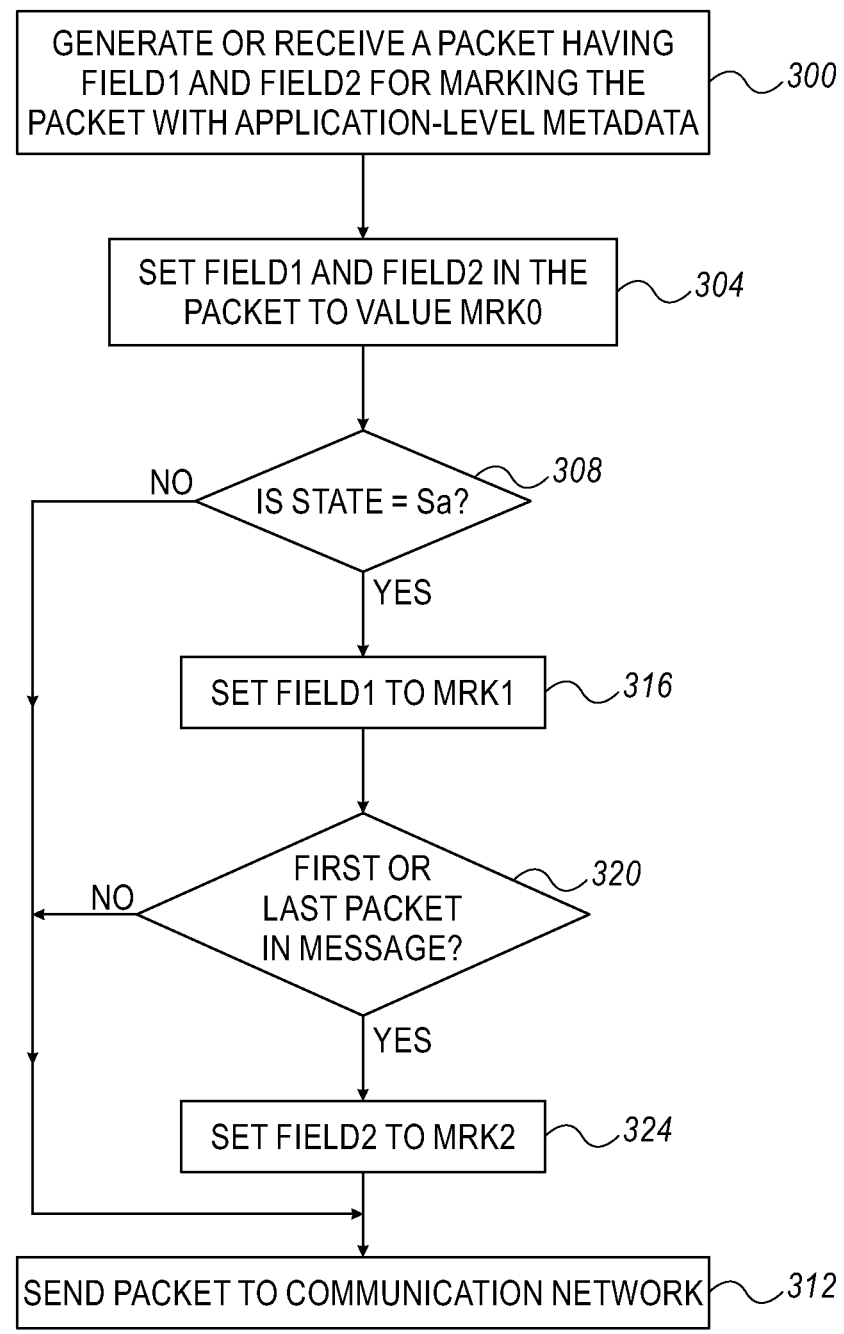
FIG. 6 is a flow chart that schematically illustrates a method for marking packets with application-level metadata, in accordance with an embodiment that is described herein.

FIG. 6 is a flow chart that schematically illustrates a method for marking packets with application-level metadata, in accordance with an embodiment that is described herein.

The method will be described as executed by processor 152 of network node 150, running an application program 172. It is further assumed that network node 150 implements network node 24 in the computing system of FIG. 1.

The method begins with processor 152 generating or receiving a packet for transmission over communication network 28, at a packet generation/reception step 300. In the present example, the packet comprises two fields denoted FIELD1 and FIELD2 for marking the packets with application-level metadata. In this example, each of the fields may be marked with a marking value selected from predefined marking values denoted MRK0, MRK1 and MRK2.

At a default marking step 304, the processor marks both FIELD1 and FIELD2 with the value MRK0. At a state query step 308, the processor checks whether application program 172 is at an execution state denoted Sa, and if not, proceeds to sending the packet to communication network 28, at a packet transmission step 312. Otherwise, the application program is at the execution state Sa, and the processor modifies the marking value of FIELD1 to MRK1, at a state marking step 316.

At a message boundary checking step 320, the processor checks whether the packet received at step 300 is the first or last packet in a corresponding message, and if not, proceeds to step 312 for sending the packet to communication network 28. Otherwise, this is a first or a last packet in the message, and the processor modifies the value in FIELD2 to MRK2, at a boundary marking step 324. Following step 324 the processor proceeds to step 312 for sending the packet to communication network 28.

In the method of FIG. 6, it was assumed that the received packets comprise the fields FIELD1 and FIELD2. This, however, is not mandatory. In other embodiments, packet fields such as FIELD1, FIELD2 may be added to the packet when needed to be marked with relevant values.

In the method of FIG. 6, FIELD1 may serve for distinguishing between periods during which the application program is in execution state Sa (MRK1) or not (MRK0). In addition, FIELD2 may serve for indicating message boundaries.

A network switch that receives packets generated using the method of FIG. 6 may use the application-level metadata in the packets for triggering the generation of telemetry data only when the application program is at execution state Sa.

Figure 7:
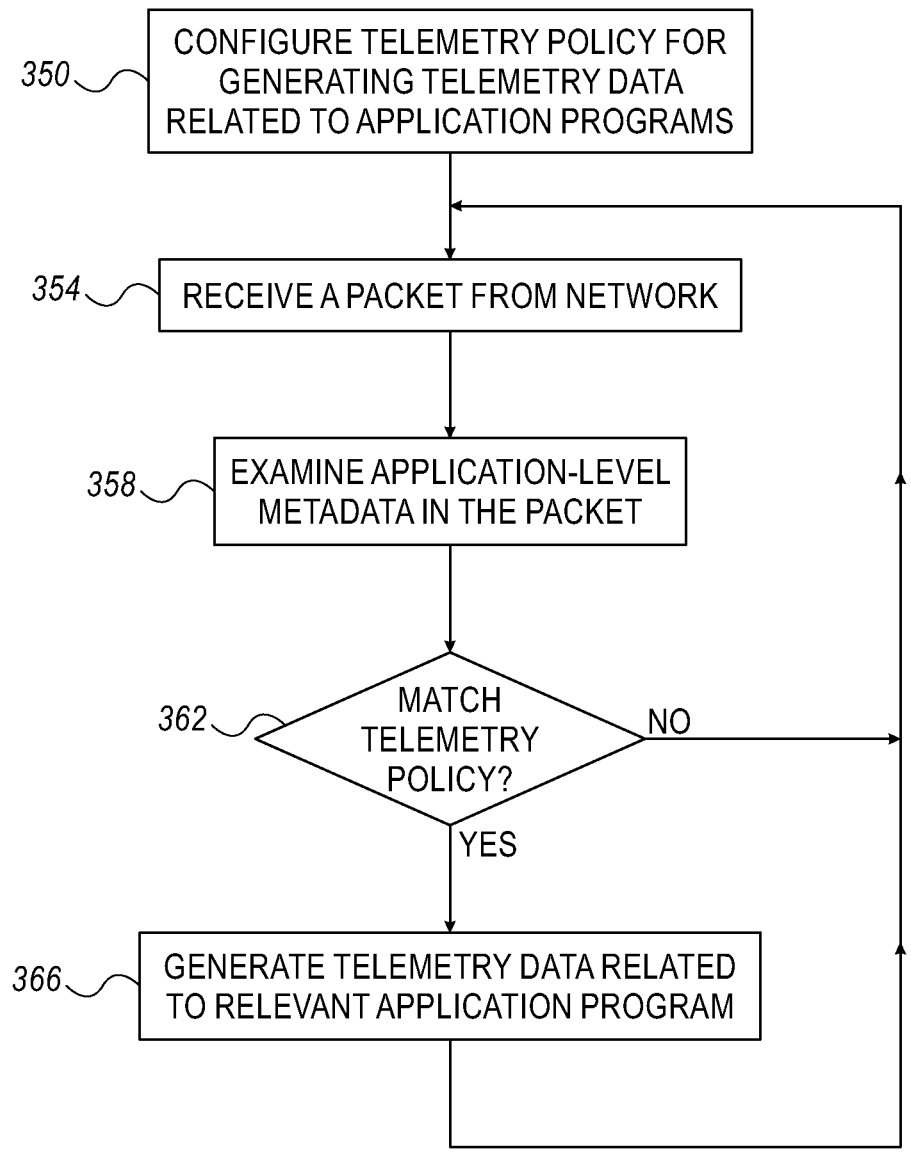
FIG. 7 is a flow chart that schematically illustrates a method for generating telemetry data based on application-level metadata, in accordance with an embodiment that is described herein.

FIG. 7 is a flow chart that schematically illustrates a method for generating telemetry data based on application-level metadata, in accordance with an embodiment that is described herein.

The method will be described as executed by switch 100, and in particular by telemetry module 120. It is further assumed that switch 100 implements network device (e.g., switch) 36 of the communication network 28 in FIG. 1.

The method begins with telemetry module 120 configuring a telemetry policy for generating telemetry data, at a policy configuration step 350. For example, the telemetry policy may specify rules and conditions for triggering the generation of telemetry data related to one or more application programs.

At a packet reception step 354, the telemetry module receives a packet from communication network 28. At an examination step 358, the telemetry module examines application-level metadata in the received packet, and at a matching checking step 362, checks whether the application-level metadata matches the telemetry policy. A match event occurs when one or more conditions for generating telemetry data, as specified in the telemetry policy, are fulfilled. For example, a match event occurs when an execution state marked in the packet equals an execution state specified in the telemetry policy.

When no match is found at step 362, the telemetry module loops back to step 354 to receive another packet from the communication network. Otherwise, a match has occurred, and the telemetry module generates telemetry data related to the application program that has sent the packet, in accordance with the telemetry policy, at a telemetry data generation step 366. Following step 366, the telemetry module loops back to step 354 to receive a subsequent packet.

In the method of FIG. 7, the telemetry module examines application-level metadata in received packets. In alternative embodiments, the telemetry module receives the application-level metadata for examination rather than receiving the entire packet.

In the example method above, checking for a match at step 362 is based, for example, on content of telemetry fields in a single packet. In other embodiments, checking for a policy match may be based on content of telemetry fields in multiple received packets.

Profiling Sessions

Figure 8:
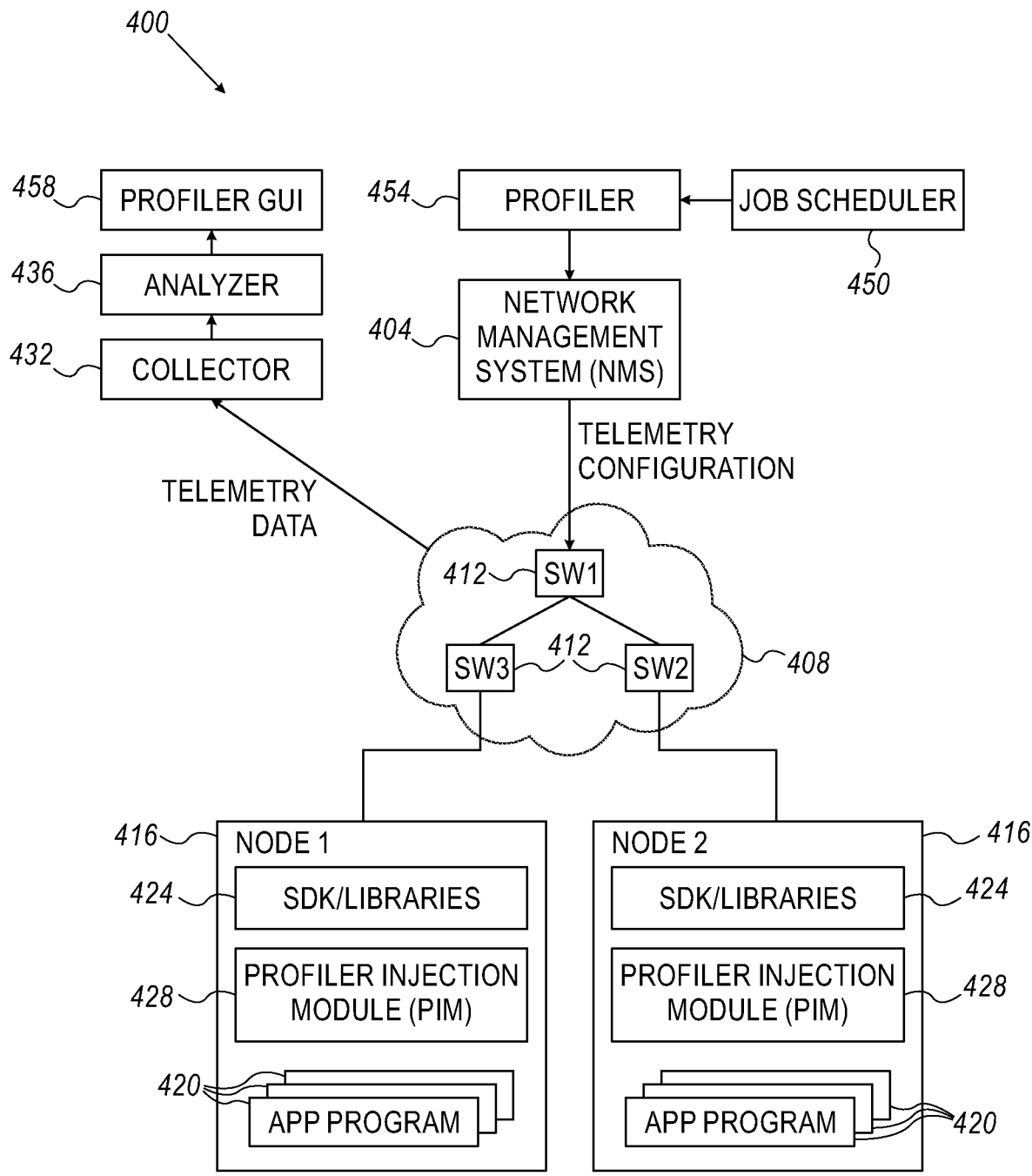
FIG. 8 is a diagram that schematically illustrates a computing system running a profiling session, in accordance with an embodiment that is described herein.

FIG. 8 is a diagram that schematically illustrates a computing system running a profiling session, in accordance with an embodiment that is described herein.

Computing system 400 comprises a Network Management System (NMS) 404 that manages a communication network 408 comprising multiple interconnected network switches 412. Although the communication network in FIG. 8 comprises three switches denoted SW1, SW2 and SW3, in practical implementations, any suitable number of network switches larger than three (e.g., thousands of switches) can also be used.

In computing system 400, multiple network nodes 416 communicate with one another over communication network 408. Each of network nodes 416 runs one or more application programs 420. In some embodiments, multiple application programs running on multiple respective network nodes collectively comprise a distributed program.

An application program 420 may access the communication network, by calling suitable communication functions in pre-compiled SDKs/libraries 424 using a suitable API. Network node 416 runs a Profiler Injection Module (PIM) 428 that incorporates application-level metadata, e.g., in the form of marks in certain fields of selected packets that the network node sends to the communication network. In some embodiments, the profiler runs an application program from its own context and incorporates application-level metadata in outgoing packets using PIM 428 without involving the application program.

Computing system 400 further comprises a collector 432 and an analyzer 436. The collector receives telemetry data from the communication network and stores the telemetry data to be consumed by the analyzer. The analyzer consumes telemetry data from the collector, analyzes the telemetry data, and prepares the analyzed telemetry data for presentation.

In some embodiments, at least part of the telemetry data is related to one or more application programs. In such embodiments, the analyzer prepares the telemetry data for presentation so as to distinguish between parts of the telemetry data that relate to different application programs, different execution states and the like.

Next are described phases carried out in running a profiling session. In a configuration phase, a job scheduler 450 runs a profiler 454 on one or more network nodes 416, for launching in the network nodes application programs and PIMs. The job scheduler and profiler typically run on different respective servers. For example, the job scheduler may run on a scheduling node (not shown), and the profiler may run on a dedicated Management Server (e.g., NMS 404). The profiler further configures, e.g., using NMS 404, switches (and possibly network adapters) across the communication network with telemetry generation rules that specify conditions for generating telemetry data. The configured rules may specify reading certain counters (e.g., for counting packets or bytes), sampling rules, transport later marking values, and the like.

After configuration, at a telemetry collection phase, telemetry data is generated in the communication network based on the configured telemetry rules, and collected by collector 432. At a presentation phase, analyzer 436 consumes the collected telemetry data for analysis, and prepares the analyzed telemetry data for presentation. A profiler GUI 458 uses (possibly among other tasks) for presenting the analyzed telemetry data using any suitable presentation method. For example, the profiler GUI may present analyzed telemetry data using dashboards corresponding to fabric tenants. Alternatively or additionally, the profiler GUI presents a single coherent timeline depicting a tracing of the marked application programs flow. In the present example, profiler 454 and profiler GUI 458 may run on the same server, e.g., on NMS 404.

The embodiments described above are given by way of example, and other suitable embodiments can also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
a plurality of ports, to connect to a communication network;
packet processing circuitry, to forward packets between the plurality of ports, including receiving, over the communication network, a packet originating from a remote host running an application program, the packet comprising application-level metadata relating to the application program, and forwarding the packet over the communication network to another remote host running the application program; and
a telemetry processing circuitry, to:
hold a telemetry policy that specifies conditions for triggering telemetry data generation;
receive the application-level metadata of the received packet from the packet processing circuitry;
generate, in response to a match between the application-level metadata in the received packet and one or more of the conditions specified in the telemetry policy, telemetry data indicative of a network traffic condition of the network device affecting the received packet;
tag the generated telemetry data with a tag that associates the network traffic condition of the network device with the application-level metadata of the application running on the remote host; and
transmit the tagged telemetry data via one of the plurality of ports, over the communication network to a system management node.

2. The network device according to claim 1, wherein the application-level metadata comprises an application identifier pre-assigned to the application program.

3. The network device according to claim 1, wherein the application program has multiple execution states, and wherein the application-level metadata is indicative of a selected execution state among the multiple execution states.

4. The network device according to claim 3, wherein the telemetry processing circuitry is to generate the telemetry data in response to detecting that the application-level metadata comprises the selected execution state and not any other execution state.

5. The network device according to claim 1, wherein the telemetry processing circuitry is to tag one or more parts of the telemetry data with respective tags related to the application program, based on the application-level metadata.

6. The network device according to claim 1, wherein the telemetry processing circuitry is to trigger generation of the telemetry data in response to the application-level metadata.

7. The network device according to claim 1, wherein the telemetry processing circuitry is to generate at least part of the telemetry data independently of the application-level metadata.

8. The network device according to claim 1, wherein the telemetry processing circuitry is to receive telemetry data collected by one or more other network elements coupled to the communication network, and to analyze the received telemetry data for presentation.

9. The network device according to claim 1, wherein, based on the application-level metadata, the processing circuitry is to mirror at least part of a packet comprising the telemetry data back to the remote network node that has sent the packet comprising the application-level metadata, for analysis.

10. The network device according to claim 1, further comprising a processor to run at least part of an analyzer program that analyzes the telemetry data based at least on parts in the telemetry data that are tagged in relation to the application program.

11. The network device according to claim 1, wherein the packet is comprised in a message that the application program sends over the communication network to a peer network node, wherein the application-level metadata is indicative of a position of the packet within the message, and wherein the telemetry processing circuitry is to generate the telemetry data based on the position of the packet within the message.

12. The network device according to claim 1, wherein the network traffic condition, indicated by the telemetry data, comprises a local traffic bottleneck in the network device.

13. The network device according to claim 1, wherein the network traffic condition, indicated by the telemetry data, comprises ingress-to-egress latency in the network device.

14. The network device according to claim 1, wherein the network traffic condition, indicated by the telemetry data, comprises a condition of one or more queues in the network device.

15. A method, comprising:
in a network device that connects to a communication network by a plurality of ports, forwarding packets between the plurality of ports, including receiving over the communication network a packet originating from a remote host running an application program, the packet comprising application-level metadata relating to the application program, and forwarding the packet over the communication network to another remote host running the application program;
holding in the network device a telemetry policy that specifies conditions for triggering telemetry data generation;
generating, in response to a match between the application-level metadata in the received packet and one or more of the conditions specified in the telemetry policy, telemetry data indicative of a network traffic condition of the network device affecting the received packet;
tagging the generated telemetry data with a tag that associates the network traffic condition of the network device with the application-level metadata of the application running on the remote host; and
transmitting the tagged telemetry data, via one of the plurality of ports, over the communication network to a system management node.

16. The method according to claim 15, wherein the application-level metadata comprises an application identifier pre-assigned to the application program.

17. The method according to claim 15, wherein the application program has multiple execution states, and wherein the application-level metadata is indicative of a selected execution state among the multiple execution states.

18. The method according to claim 17, wherein generating the telemetry data comprises generating the telemetry data in response to detecting that the application-level metadata comprises the selected execution state and not any other execution state.

19. The method according to claim 15, wherein generating the telemetry data comprises tagging one or more parts of the telemetry data, with respective tags related to the application program, based on the application-level metadata.

20. The method according to claim 15, wherein generating the telemetry data comprises triggering generation of the telemetry data in response to the application-level metadata.

21. The method according to claim 15, wherein generating the telemetry data comprises generating at least part of the telemetry data independently of the application-level metadata.

22. The method according to claim 15, and comprising receiving telemetry data collected by one or more other network elements coupled to the communication network, and analyzing the received telemetry data for presentation.

23. The method according to claim 15, and comprising, based on the application-level metadata, mirroring at least part of a packet comprising the telemetry data back to the remote network node that has sent the packet comprising the application-level metadata, for analysis.

24. The method according to claim 15, and comprising running at least part of an analyzer program that analyzes the telemetry data based at least on parts in the telemetry data that are tagged in relation to the application program.

25. The method according to claim 15, wherein the packet is comprised in a message that the application program sends over the communication network to a peer network node, wherein the application-level metadata is indicative of a position of the packet within the message, and wherein generating the telemetry data comprises generating the telemetry data based on the position of the packet within the message.

\* \* \* \* \*